United States Patent
Naito

(10) Patent No.: US 8,233,647 B2
(45) Date of Patent: Jul. 31, 2012

(54) TELEVISION SET

(75) Inventor: Tadahiro Naito, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1115 days.

(21) Appl. No.: 12/103,997

(22) Filed: Apr. 16, 2008

(65) Prior Publication Data
US 2008/0285779 A1 Nov. 20, 2008

(30) Foreign Application Priority Data
May 15, 2007 (JP) .................................. 2007-129539

(51) Int. Cl.
H04R 1/02 (2006.01)
H04R 1/40 (2006.01)
H04R 5/02 (2006.01)
H04N 5/64 (2006.01)
H05K 5/00 (2006.01)

(52) U.S. Cl. .................. 381/306; 348/836; 361/679.23; 381/97; 381/333; 381/388

(58) Field of Classification Search .................. 381/306, 381/333, 97; 361/679.23
See application file for complete search history.

(56) References Cited

U.S. PATENT DOCUMENTS

| | | | | |
|---|---|---|---|---|
| 4,410,761 A * | 10/1983 | Schickedanz | ............... | 386/269 |
| 4,528,597 A * | 7/1985 | Klein et al. | ............... | 348/838 |
| 5,587,876 A * | 12/1996 | O'Brien et al. | ............. | 361/679.23 |
| 5,956,411 A * | 9/1999 | Edgar | ............... | 381/97 |
| 6,024,335 A * | 2/2000 | Min | ............... | 248/371 |
| 6,052,275 A * | 4/2000 | Joseph | ............... | 361/679.23 |
| 6,268,997 B1 * | 7/2001 | Hong | ............... | 361/679.07 |
| 6,643,377 B1 * | 11/2003 | Takahashi et al. | ............. | 381/306 |
| 6,801,426 B2 * | 10/2004 | Ichimura | ............... | 361/679.06 |
| 6,819,550 B2 * | 11/2004 | Jobs et al. | ............... | 361/679.22 |
| 7,226,028 B2 * | 6/2007 | Lin | ............... | 248/291.1 |
| 7,369,672 B2 * | 5/2008 | Hirschhorn | ............... | 381/333 |
| 7,472,048 B2 * | 12/2008 | Puckette | ............... | 703/6 |
| 7,542,815 B1 * | 6/2009 | Berchin | ............... | 700/94 |
| 7,677,517 B2 * | 3/2010 | Suzuki | ............... | 248/349.1 |
| 8,023,049 B2 * | 9/2011 | Ueno | ............... | 348/836 |
| 2003/0235320 A1 * | 12/2003 | Hirschhorn | ............... | 381/333 |
| 2006/0067552 A1 * | 3/2006 | Chen | ............... | 381/333 |
| 2007/0274547 A1 * | 11/2007 | Ueno | ............... | 381/306 |
| 2008/0031473 A1 * | 2/2008 | Yarygin et al. | ............... | 381/97 |
| 2008/0117342 A1 * | 5/2008 | Ueno | ............... | 348/836 |

FOREIGN PATENT DOCUMENTS

| | | | |
|---|---|---|---|
| JP | 04336784 A | * | 11/1992 |
| JP | 5-34786 U | | 5/1993 |
| JP | 9-51585 A | | 2/1997 |
| JP | 2004258055 A | * | 9/2004 |
| JP | 2004304679 A | * | 10/2004 |
| JP | 2005101907 A | * | 4/2005 |
| JP | 2006005795 A | * | 1/2006 |
| JP | 2007251717 A | * | 9/2007 |

* cited by examiner

Primary Examiner — Elvin G Enad
Assistant Examiner — Christina Russell
(74) Attorney, Agent, or Firm — Crowell & Moring LLP

(57) ABSTRACT

This television set includes a first speaker portion and a second speaker portion provided on prescribed left and right positions of a display screen portion respectively, a driving portion turning the display screen portion and a control portion controlling the first speaker portion and the second speaker portion so that the first speaker portion and the second speaker portion output different sounds enabling the user to identify the distances from the first and second speaker portions to the user respectively when the driving portion turns the display screen portion.

15 Claims, 5 Drawing Sheets

L1>L2

USER

L1≒L2

USER

TELEVISION SET

BACKGROUND OF THE INVENTION

1. Field of the Invention

The present invention relates to a television set, and more particularly, it relates to a television set comprising a driving portion turning a display screen portion.

2. Description of the Background Art

A television set comprising a driving portion turning a display screen portion or the like is known in general, as disclosed in each of Japanese Utility Model Laying-Open No. 5-34786 (1993) and Japanese Patent Laying-Open No. 9-51585 (1997), for example.

The aforementioned Japanese Utility Model Laying-Open No. 5-34786 discloses a television turntable instruction unit (television set) comprising an input portion capable of detecting the position of a headset capable of transmitting an operating signal, a control portion performing prescribed control on the basis of information received in the input portion and a rotational mechanism portion rotating a television screen through the control portion. In this television turntable instruction unit described in Japanese Utility Model Laying-Open No. 5-34786, the input portion specifies the position of the headset transmitting the operating signal and the control portion controls the rotational mechanism portion, so that the television screen can be directed toward the headset.

The aforementioned Japanese Patent Laying-Open No. 9-51585 discloses a rotation control unit comprising a receiving portion receiving a remote control signal from a transmitter, a rotational angle operating portion (angle output unit) calculating the direction angle of the remote control signal and the distance between the rotation control unit and the transmitter on the basis of an output from the receiving portion for outputting a prescribed signal and a rotation/stop control portion rotating a television receiver on the basis of the signal output from the rotational angle operating portion. In this rotation control unit described in Japanese Patent Laying-Open No. 9-51585, the receiving portion specifies the position of the transmitter transmitting the remote control signal and the rotational angle operating portion controls the rotation/stop control portion, so that the television receiver can be directed toward the transmitter.

In the television turntable instruction unit (television set) described in the aforementioned Japanese Utility Model Laying-Open No. 5-34786, however, the television screen is directed toward the headset on the basis of the direction of the operating signal transmitted from the headset, and hence the user must wear the headset, in order to obtain the optimum broadcast receiving state with respect to the television screen. Therefore, the user must temporarily wear the headset to direct the television screen thereto and thereafter take off the headset even if the user would like to receive a television broadcast or the like without using the headset, and hence the operation for setting the television screen to the optimum broadcast receiving position is disadvantageously complicated.

Also in the rotation control unit (television set) described in the aforementioned Japanese Patent Laying-Open No. 9-51585, the television receiver is directed toward the transmitter on the basis of the direction of the remote control signal transmitted from the transmitter, and hence the rotational position of the television receiver is conceivably decided by the position of the transmitter. Considering the situation of general use of the transmitter, the transmitter held by the user transmits the remote control signal from a position different from that of his/her head, and hence the television receiver is not rotated to a position directed to the user in the strict sense of the word. Therefore, it may sometimes be impossible for the user to adjust the television receiver (display screen portion) to the position optimum for receiving a television broadcast or the like.

SUMMARY OF THE INVENTION

The present invention has been proposed in order to solve the aforementioned problems, and an object of the present invention is to provide a television set enabling the user to adjust a display screen portion to a position optimizing the state of receiving a television broadcast or the like with no complicated operation.

A television set according to an aspect of the present invention comprises a first speaker portion and a second speaker portion provided on prescribed left and right positions of a display screen portion respectively, a driving portion turning the display screen portion and a control portion controlling the first speaker portion and the second speaker portion so that the first speaker portion and the second speaker portion output different sounds enabling the user to identify the distances from the first and second speaker portions to the user respectively when the driving portion turns the display screen portion.

As hereinabove described, the television set according to the aspect of the present invention comprises the control portion controlling the first speaker portion and the second speaker portion so that the first speaker portion and the second speaker portion output the different sounds enabling the user to identify the distances from the first and second speaker portions to the user respectively when the driving portion turns the display screen portion so that the magnitudes (sonority levels) of the sounds output from the first and second speaker portions respectively regularly vary with the turning operation of the display screen portion on an arbitrary position (observation point), whereby the user can identify the distances from the first and second speaker portions to the user respectively by distinguishing the respective magnitudes (strength levels) of the sounds received from the first and second speaker portions respectively from each other upon turning of the display screen portion. Therefore, the user can recognize that the distances from the first and second speaker portions to the user are substantially equal to each other in relation to the rotational position of the display screen portion when perceiving no variations in the respective magnitudes (strength levels) of the sounds received from the first and second speaker portions. At this time, the user may not wear a headset or the like. Therefore, the user can adjust the display screen portion to a position for optimally receiving a television broadcast or the like with no complicated operation.

In the television set according to the aforementioned aspect, the control portion is preferably so formed as to control the first speaker portion and the second speaker portion so that the first speaker portion and the second speaker portion output the different sounds, enabling the user to identify the distances from the first and second speaker portions to the user respectively, of sound pressure levels substantially equal to each other. According to this structure, the sound pressure levels (magnitudes of the sounds) from the first and second speaker portions can more remarkably vary with the turning operation of the display screen portion, whereby the user can easily perceive the degrees of the variations in the sound pressure levels. Thus, the user can easily determine the optimum broadcast receiving position (turning angle of the display screen portion).

In the television set according to the aforementioned aspect, the control portion is preferably so formed as to control the first speaker portion and the second speaker portion so that the first speaker portion and the second speaker portion output the different sounds, enabling the user to identify the distances from the first and second speaker portions to the user respectively, of phases substantially equal to each other. According to this structure, sound waves output from the first and second speaker portions respectively can remarkably maximally enhance each other in the positional relation between the first and second speaker portions and the user along with the turning operation of the display screen portion, whereby the user can easily determine the optimum broadcast receiving position (turning angle of the display screen portion).

In the television set according to the aforementioned aspect, the control portion is preferably so formed as to control the first speaker portion and the second speaker portion so that the first speaker portion and the second speaker portion output the different sounds having a phase difference of a prescribed angle and enabling the user to identify the distances from the first and second speaker portions to the user respectively. According to this structure, the sound waves oscillated from the first and second speaker portions cancel each other so that the user catches no sounds if the distances from the first and second speaker portions to the user are substantially equal to each other when a phase difference of 180° ($\pi$ radians) is provided between the sounds output from the first and second speaker portions respectively, for example. Through this principle, the user can determine that the display screen portion is set on the rotational position providing the optimum broadcast receiving state when catching no sounds upon the turning operation of the display screen portion. Thus, the user can easily determine the optimum broadcast receiving position (turning angle of the display screen portion).

In the television set according to the aforementioned aspect, the control portion is preferably so formed as to control the first speaker portion and the second speaker portion so that the first speaker portion and the second speaker portion output the different sounds which are sounds including information related to the positions of the first speaker portion and the second speaker portion respectively and enabling the user to identify the distances from the first and second speaker portions to the user respectively. According to this structure, the user can identify the distances from the first and second speaker portions to the user respectively by distinguishing the sonority levels of the information received from the first and second speaker portions respectively from each other along with the turning operation of the display screen portion when the first speaker portion outputs a sound including positional information such as "right, right, right" and the second speaker portion outputs a sound including positional information such as "left, left, left", for example. Thus, the user can easily determine the optimum broadcast receiving position (turning angle of the display screen portion).

In the television set according to the aforementioned aspect, the control portion is preferably so formed as to control the first speaker portion to output a sound in a first frequency band and to control the second speaker portion to output a sound in a second frequency band. According to this structure, the frequency bands of the sounds output from the first and second speaker portions are different from each other, whereby the user can more reliably recognize not only the qualities of the sounds heard from the first and second speaker portions respectively but also the degrees of variations in the qualities of the sounds heard from the first and second speaker portions respectively.

In the aforementioned structure having the control portion controlling the first and second speaker portions to output the sounds in the first and second frequency bands respectively, the sound in the first frequency band and the sound in the second frequency band preferably have substantially identical frequencies. According to this structure, the strength levels of the sounds output from the first and second speaker portions respectively can more remarkably vary with the turning operation of the display screen portion, whereby the user can easily determine the optimum broadcast receiving position (turning angle of the display screen portion).

In the aforementioned structure having the control portion controlling the first and second speaker portions to output the sounds in the first and second frequency bands respectively, the sound in the first frequency band and the sound in the second frequency band preferably have a prescribed frequency difference. According to this structure, the beats of the sounds output from the two speaker portions are most remarkably caught by the user if the distances from the first and second speaker portions to the user are substantially identical to each other when a frequency difference of about several Hz is provided between the sounds in the first and second frequency bands, for example. Through this principle, the user can determine that the display screen portion is set on the position providing the optimum broadcast receiving state when most remarkably catching the beats upon the turning operation of the display screen portion. Thus, the user can easily determine the optimum broadcast receiving position (turning angle of the display screen portion).

In this case, the sound in the first frequency band preferably has a sound quality corresponding to a high-frequency band in the audio range while the sound in the second frequency band preferably has a sound quality corresponding to a low-frequency band in the audio range. According to this structure, the frequency bands of the sounds output from the first and second speaker portions respectively are different from each other, whereby the user can easily distinguish the qualities of the sounds output from the first and second speaker portions respectively from each other.

In the aforementioned structure having the control portion controlling the first and second speaker portions to output the sounds in the first and second frequency bands respectively, the control portion is preferably so formed as to control the first speaker portion and the second speaker portion to output the sound in the first frequency band and the sound in the second frequency band having substantially identical waveforms. According to this structure, the strength levels of the sounds output from the first and second speaker portions with the same waveforms can more remarkably vary with the turning operation of the display screen portion when both of the sounds in the first and second frequency bands are formed by sine waves, for example, whereby the user can easily determine the optimum broadcast receiving position (turning angle of the display screen portion).

The television set according to the aforementioned aspect preferably further comprises a memory portion storing the different sounds enabling the user to identify the distances from the first and second speaker portions to the user respectively, and the control portion is preferably so formed as to control the first speaker portion and the second speaker portion to output the different sounds enabling the user to identify the distances from the first and second speaker portions to the user respectively with the sounds stored in the memory portion. According to this structure, the aforementioned effects can be easily implemented through a sound source stored in the memory portion.

The television set according to the aforementioned aspect preferably further comprises a tuner portion receiving a broadcast signal including an audio signal, and the control portion is preferably so formed as to control the first speaker portion and the second speaker portion so that the first speaker portion and the second speaker portion output the different sounds enabling the user to identify the distances from the first and second speaker portions to the user respectively by performing prescribed audio processing on the audio signal received by the tuner portion. According to this structure, the user can identify the distances from the first and second speaker portions to the user respectively by directly catching the audio signal received by the tuner portion and audio-processed by the control portion along with the turning operation of the display screen portion. Thus, the user can more easily determine the optimum broadcast receiving position (turning angle of the display screen portion).

The television set according to the aforementioned aspect preferably further comprises a signal receiving portion capable of detecting an operating signal from a remote transmitter, and the control portion is preferably so formed as to control the driving portion turning the display screen portion on the basis of the operating signal received in the signal receiving portion from the remote transmitter. According to this structure, the user can easily adjust the optimum rotational position of the display screen portion with the remote transmitter also when receiving a television broadcast or the like at such a long distance that the user cannot directly operate the television set by touching the same with a finger or the like.

In the aforementioned structure further comprising the signal receiving portion, the control portion is preferably so formed as to control the driving portion to stop turning the display screen portion while controlling the first speaker portion and the second speaker portion to continuously output the different sounds when the display screen portion reaches a prescribed turning angle. According to this structure, the user can easily determine the position where the display screen portion reaches the prescribed turning angle is not the optimum broadcast receiving position due to the sonority levels of the sounds.

In the television set according to the aforementioned aspect, the control portion is preferably so formed as to control the first speaker portion and the second speaker portion to continuously output the different sounds for a prescribed time after the driving portion stops turning the display screen portion. According to this structure, the first and second speaker portions continuously output the sounds for the prescribed time on the rotational position of the display screen portion decided by the user, whereby the user can easily confirm whether or not the rotational position of the display screen portion is optimum.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a liquid crystal television 100 according to the embodiment of the present invention is described with reference to FIGS. 1 to 3. This embodiment of the present invention is applied to the liquid crystal television 100 employed as an exemplary television set.

Figure 1:
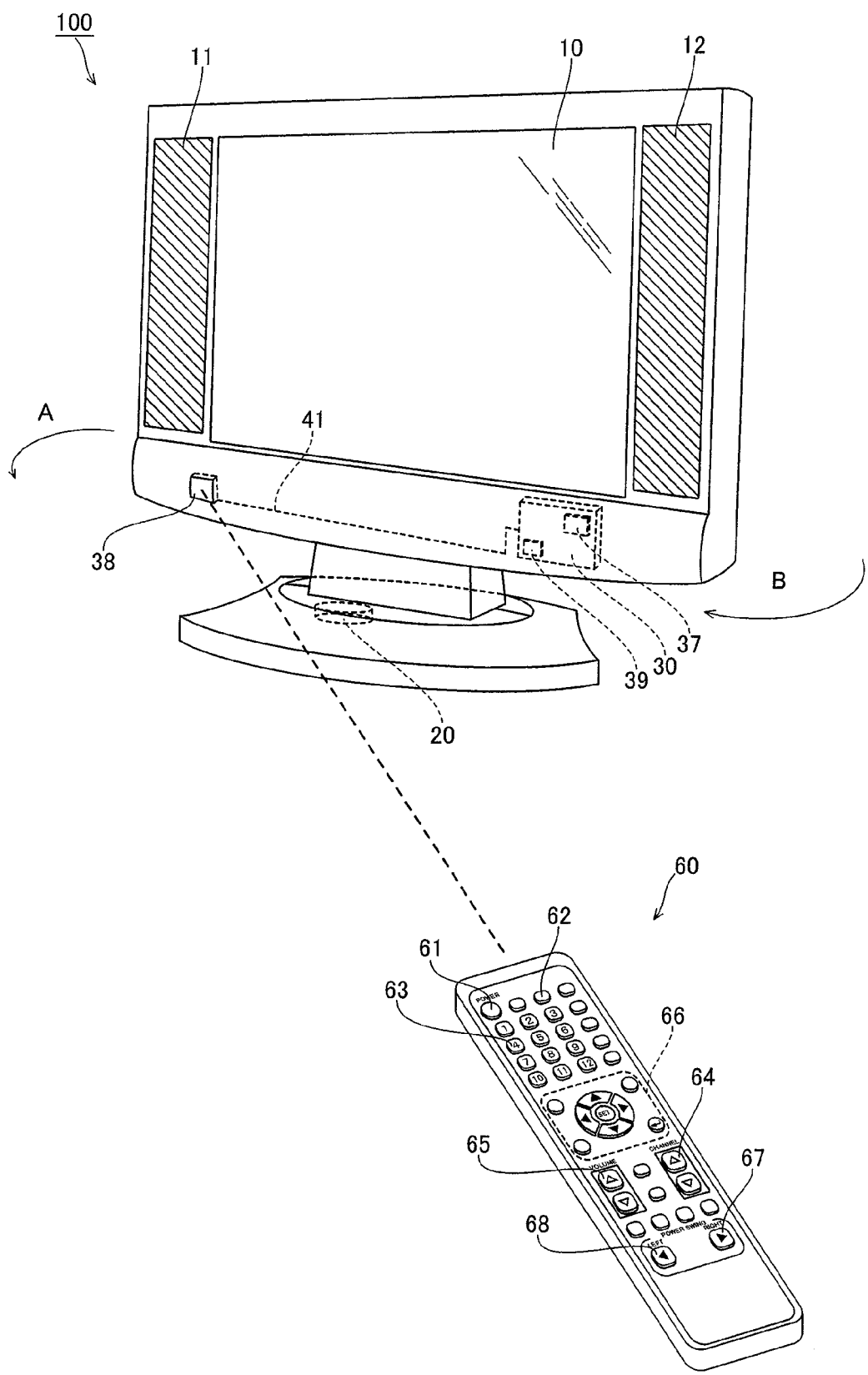
FIG. 1 illustrates the overall structure of a liquid crystal television according to an embodiment of the present invention.

In the liquid crystal television 100 according to the embodiment of the present invention, a right speaker portion 11 and a left speaker portion 12 are arranged on both sides of a display screen portion 10 respectively while a display screen driving portion 20 consisting of a stepping motor or the like is provided in the body of the liquid crystal television 100 for horizontally turning the display screen portion 10 by a prescribed angle (± about 30° according to this embodiment) in a horizontal plane along arrows A and B, as shown in FIG. 1. The user can operate the liquid crystal television 100 from a separate position with a remote transmitter 60 described later. The right speaker portion 11 and the left speaker portion 12 are examples of the "first speaker portion" and the "second speaker portion" in the present invention respectively. The display screen driving portion 20 is an example of the "driving portion" in the present invention.

Figure 2:
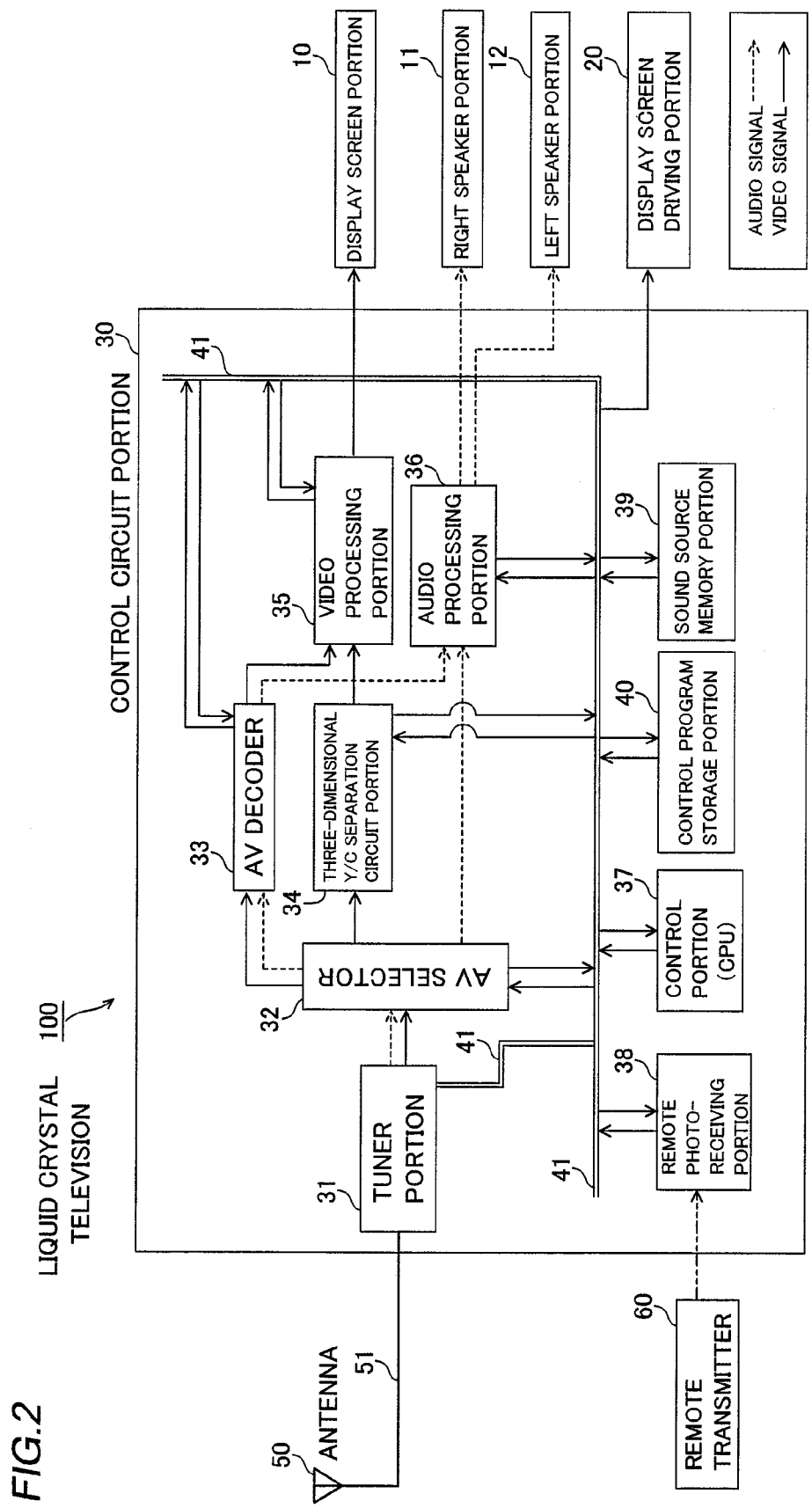
FIG. 2 is a block diagram showing the circuit structure of the liquid crystal television according to the embodiment shown in FIG. 1.

In the liquid crystal television 100, further, a control circuit portion 30 provided in the body thereof is connected to an antenna 50 through an antenna cable 51, as shown in FIG. 2. In the body of the liquid crystal television 100, the control circuit portion 30 is connected to the display screen portion 10 and the right and left speaker portions 11 and 12 respectively, to be capable of outputting a video signal included in a television broadcast wave received in the antenna 50 from a broadcast station to the display screen portion 10 while outputting an audio signal to the right and left speaker portions 11 and 12 respectively.

The control circuit portion 30 includes a tuner portion 31 receiving broadcast signal waves of an analog television broadcast and a digital television broadcast through the antenna 50, an AV selector 32 having a function of switching input/output of the video signal and the audio signal, an AV decoder 33 decoding digital video and audio signals from the tuner portion 31, a three-dimensional Y-C separation circuit portion 34 Y-C separating an analog video signal from the tuner portion 31, a video processing portion 35 processing the video signals received from the AV decoder 33 and the three-dimensional Y-C separation circuit portion 34 in various manners and an audio processing portion 36 processing the audio signal (including the audio signal received through the AV decoder 33) from the AV selector 32, as shown in FIG. 2.

According to this embodiment, the control circuit portion 30 further includes a control portion 37 consisting of a CPU for controlling the overall liquid crystal television 100, a remote photoreceiving portion 38 photoreceiving a remote control signal (infrared light or the like) from the remote transmitter 60 and converting the same to an electric signal for issuing an instruction to the control portion 37, a sound source memory portion 39 and a control program storage portion 40 in addition to the aforementioned components, as shown in FIG. 2. The remote photoreceiving portion 38 is an example of the "signal receiving portion" in the present invention.

According to this embodiment, the control portion 37 is so formed as to control the right and left speaker portions 11 and 12 so that the right and left speaker portions 11 and 12 output sounds enabling the user to identify the distances from the right and left speaker portions 11 and 12 to the user respectively in addition to the control of driving the display screen driving portion 20 when the user turns the display screen 10 toward a desired direction by remotely turning the display screen portion 10 in the horizontal direction (along arrows A and B in FIG. 1).

According to this embodiment, the sounds output from the right and left speaker portions 11 and 12 respectively when the user turns the display screen 10 in the horizontal direction (along arrows A and B in FIG. 1) have volumes (sound pressure levels) of substantially equal magnitudes. At this time, the sound output from the right speaker portion 11 is formed by a sine wave in a high-frequency band (around about 1000 Hz) in the audio range while the sound output from the left speaker portion 12 is formed by a sine wave in a low-frequency band (around about 500 Hz) in the audio range. According to this embodiment, the right and left speaker portions 11 and 12 are so formed as to output the sounds under substantially equal phase conditions. The high-frequency band and the low-frequency band are examples of the "first frequency band" and the "second frequency band" in the present invention respectively.

According to this embodiment, the control portion 37 is so formed as to control the right and left speaker portions 11 and 12 to continuously output the aforementioned sounds for a prescribed time (about five seconds) after the user remotely stops turning the display screen portion 10 in the horizontal direction (along arrows A and B in FIG. 1).

As shown in FIG. 2, the tuner portion 31 has a function of extracting a digital modulating signal of an arbitrary selected frequency from a high-frequency digital modulating signal including video and audio data of the digital television broadcast through the antenna 50 for demodulating and outputting the selected digital modulation signal. As shown in FIG. 2, the AV decoder 33 has a function of performing decode processing (decryption of signs) on the video signal (shown by solid arrow) and the audio signal (shown by broken arrow) separated by the AV selector 32 respectively for forming video data and audio data. The video data (shown by solid arrow) and the audio data (shown by broken arrow) are subjected to D-A conversion (digital-to-analog conversion) by the video processing portion 35 and the audio processing portion 36 respectively, and thereafter output from the display screen portion 10 and the right and left speaker portions 11 and 12 respectively, as shown in FIG. 2.

As shown in FIG. 2, the tuner portion 31 also has a function of demodulating and outputting a broadcast signal wave of the selected frequency included in the broadcast signal wave of the analog television broadcast through the antenna 50. As shown in FIG. 2, further, the video signal (shown by solid arrow) and the audio signal (shown by broken arrow) from the tuner portion 31 are so formed that the video signal (composite signal) separated by the AV selector 32 is output from the display screen portion 10 through the three-dimensional Y/C separation circuit portion 34 and the video processing portion 35. The audio signal separated by the AV selector 32 is output from the right and left speaker portions 11 and 12 respectively through the audio processing portion 36.

The sound source memory portion 39 is provided for previously storing qualities (frequencies, waveforms, sound pressure levels etc.) of the sounds output from the right and left speaker portions 11 and 12 respectively when the user remotely turns the display screen portion 10. Therefore, the control portion 37 is so formed as to control the right and left speaker portions 11 and 12 to output the respective sounds through sound source data stored in the sound source memory portion 39 when the user turns the display screen portion 10. The control program storage portion 40 stores various control programs, so that the control portion 37 executes functions of the liquid crystal television 100 in response to a remote control operation of the user or the like. The components of the control circuit portion 30 are connected with each other through buses (transmission lines) 41 as shown in FIG. 2, to be capable of transferring control signals and control data to each other.

Figure 3:
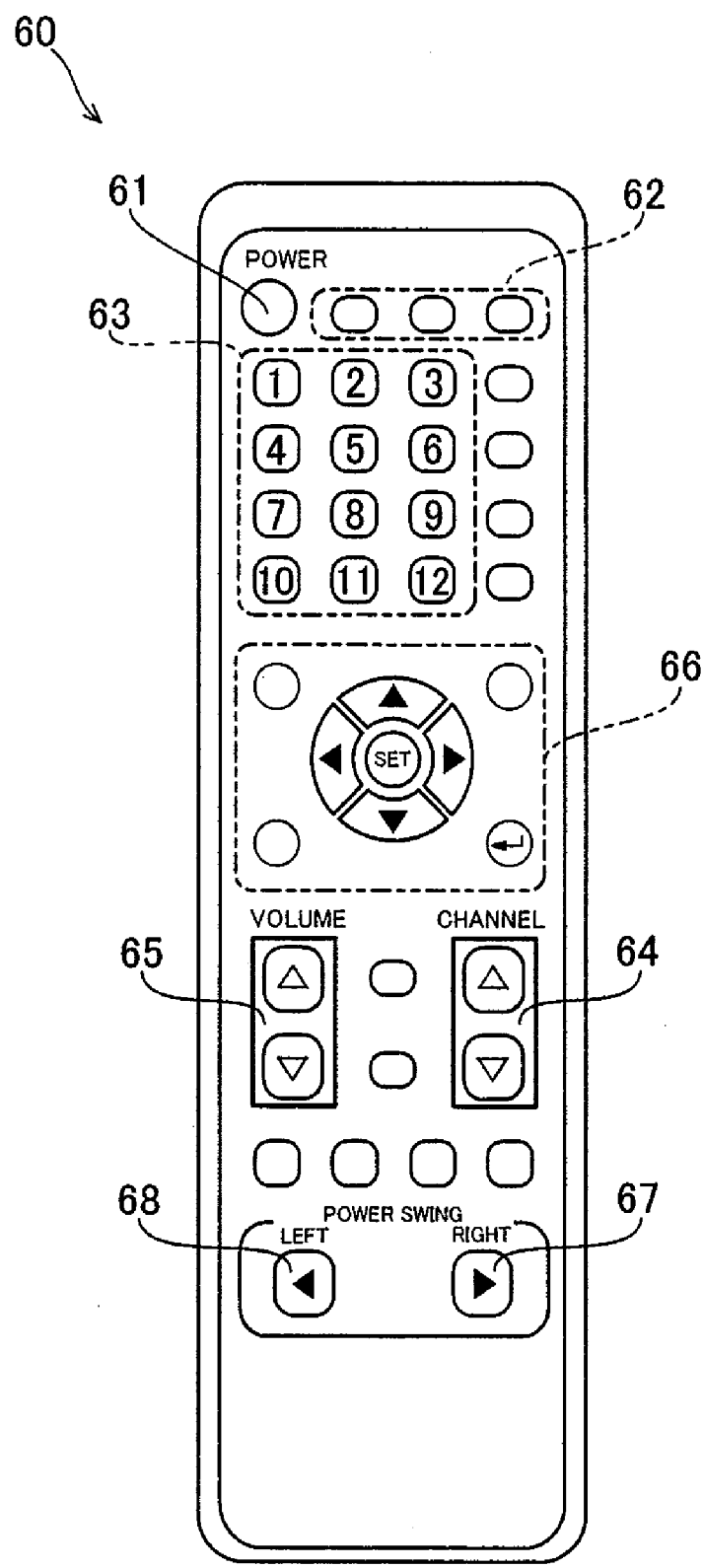
FIG. 3 illustrates a remote transmitter for operating the liquid crystal television according to the embodiment shown in FIG. 1.

As shown in FIG. 3, the remote transmitter 60 is constituted of a power supply button 61 for turning on/off the power source for the liquid crystal television 100, a mode switching button group 62 for audio switching, input switching etc., a channel input button group 63 for directly inputting and selecting the channel of a television program, a channel up/down button 64 for changing the currently selected channel, a volume control button 65 and an operating button group 66 for setting the liquid crystal television 100 in various ways through the display screen portion 10.

According to this embodiment, the remote transmitter 60 is further provided with a right turning button 67 and a left turning button 68 in addition to the aforementioned components, as shown in FIG. 3. The user can turn the display screen portion 10 of the liquid crystal television 100 toward the desired direction by pushing down the right turning button 67 or the left turning button 68 when receiving a television program or the like. The control portion 37 is so formed as to control the right and left speaker portions 11 and 12 to output the aforementioned sounds when the user turns the display screen portion 10 in the horizontal direction (along arrows A and B in FIG. 1).

The operation of turning the display screen portion 10 of the liquid crystal television 100 according to this embodiment is now described with reference to FIGS. 1 to 6.

Figure 4:
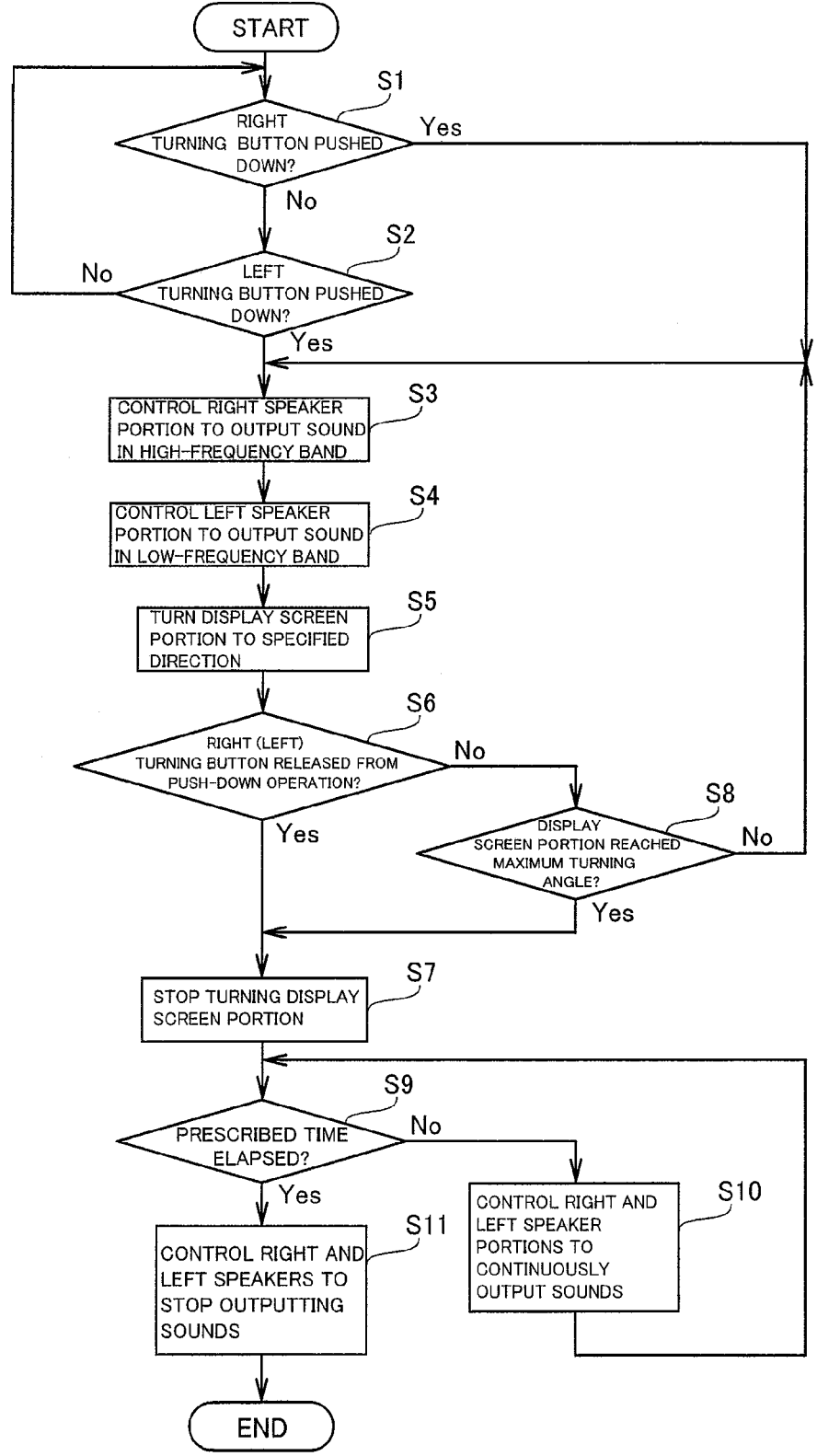
FIG. 4 is a flow chart for illustrating an operation of turning a display screen portion of the liquid crystal television according to the embodiment shown in FIG. 1.

When the power source for the liquid crystal television 100 is in an ON-state, the control portion 37 determines whether or not the user has pushed down the right turning button 67 (see FIG. 3) of the remote transmitter 60 (see FIG. 3) at a step S1, as shown in FIG. 4. If determining that the user has not pushed down the right turning button 67 of the remote transmitter 60, the control portion 37 determines whether or not the user has pushed down the left turning button 67 (see FIG. 3) of the remote transmitter 60 (see FIG. 3) at a step S2, and returns to the step S1 for repeating the aforementioned determination if determining that the user has not pushed down the left turning button 68 of the remote transmitter 60.

According to this embodiment, the control portion 37 controls the right speaker portion 11 (see FIG. 2) to output the sound formed by the sine wave in the high-frequency band (around about 1000 Hz) at a step S3 if determining that the user has pushed the right turning button 67 of the remote transmitter 60 at the step S1 or determining that the user has pushed down the left turning button 68 at the step S2. At a step S4, the control portion 37 controls the left speaker portion 12 (see FIG. 2) to output the sound formed by the sine wave in the low-frequency band (around about 500 Hz). The control portion 37 controls the right and left speaker portions 11 and 12 to output the sounds under the substantially equal phase conditions at the steps S3 and S4 respectively. In the following description, it is assumed that the user has pushed down the left turning button 68.

Figure 5:
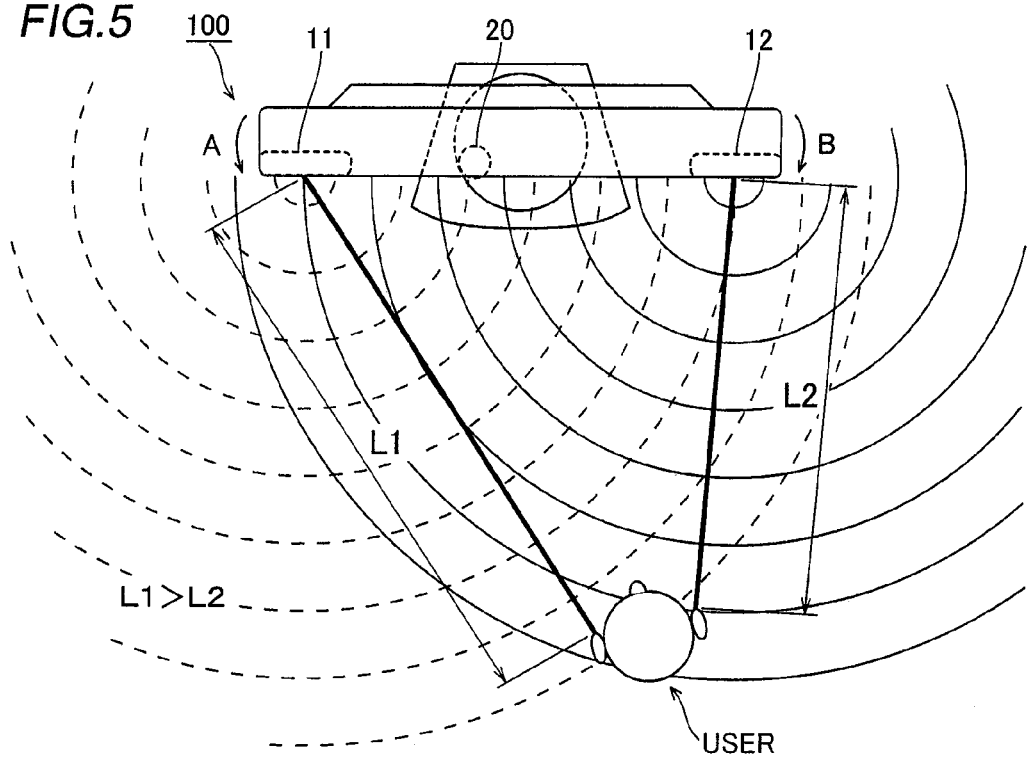
FIGS. 5 and 6 illustrate broadcast receiving states of the user following the turning operation of the liquid crystal television according to the embodiment shown in FIG. 1.

According to this embodiment, the control portion 37 controls the right and left speaker portions 11 and 12 to output the sounds with volumes (sound pressure levels) substantially equal to each other respectively. Thus, the user can catch the sounds from the liquid crystal television 100 in a state capable of identifying the distances L1 and L2 from the user to the right and left speaker portions 11 and 12 of the liquid crystal television 100, as shown in FIG. 5. When the user and the liquid crystal television 100 are in the positional relation (the liquid crystal television 100 does not face the user frontward) shown in FIG. 5, the sonority levels of the sound (sine wave sound around about 1000 Hz) output from the right speaker portion 11 and the sound (sine wave sound around about 500 Hz) of the sound output from the left speaker portion 12 are different from each other, and hence the user can recognize that the distances L1 and L2 are different from each other. In other words, the sound output from the left speaker portion 12 is heard louder than the sound output from the right speaker portion 11, whereby the user can recognize that the distances L1 and L2 are in the relation L1>L2.

At a step S5, the control portion 37 controls the display screen driving portion 20 to turn the display screen portion 10 in the direction (along arrow A) of the left turning button 68 pushed down by the user, as shown in FIG. 1.

Following the turning of the display screen portion 10 along arrow A, the distances between from the user to the right and left speaker portions 11 and 12 of the liquid crystal television 100 gradually vary from the state shown in FIG. 5. In other words, the user recognizes the variations of the distances L1 and L2 as those of the sonority levels of the sounds received from the right and left speaker portions 11 and 12.

If the user determines that the sonority levels of the sounds received from the right and left speaker portions 11 and 12 are substantially identical to each other following the turning operation of the display screen portion 10 along arrow A (see FIG. 5), the distances L1 and L2 from the user to the right and left speaker portions 11 and 12 of the liquid crystal television 100 substantially equal to each other (L1≈L2). At this time, the liquid crystal television 100 faces the user substantially frontward, whereby the user recognizes that the composite sound of those received from the right and left speaker portions 11 and 12 is heard loudest.

The control portion 37 determines whether or not the left turning button 68 (see FIG. 3) has been released from the push-down operation at a step S6, and controls the display screen driving portion 20 to stop turning the display screen portion 10 along arrow A (see FIG. 6) if determining that the left turning button 68 has been released from the push-down operation. If determining that the left turning button 68 is not released from the push-down operation at the step S6, on the other hand, the control portion 37 determines whether or not the display screen portion 10 has reached the maximum turning angle (about 30° according to this embodiment) along arrow A (see FIG. 6) at a step S8.

Figure 6:
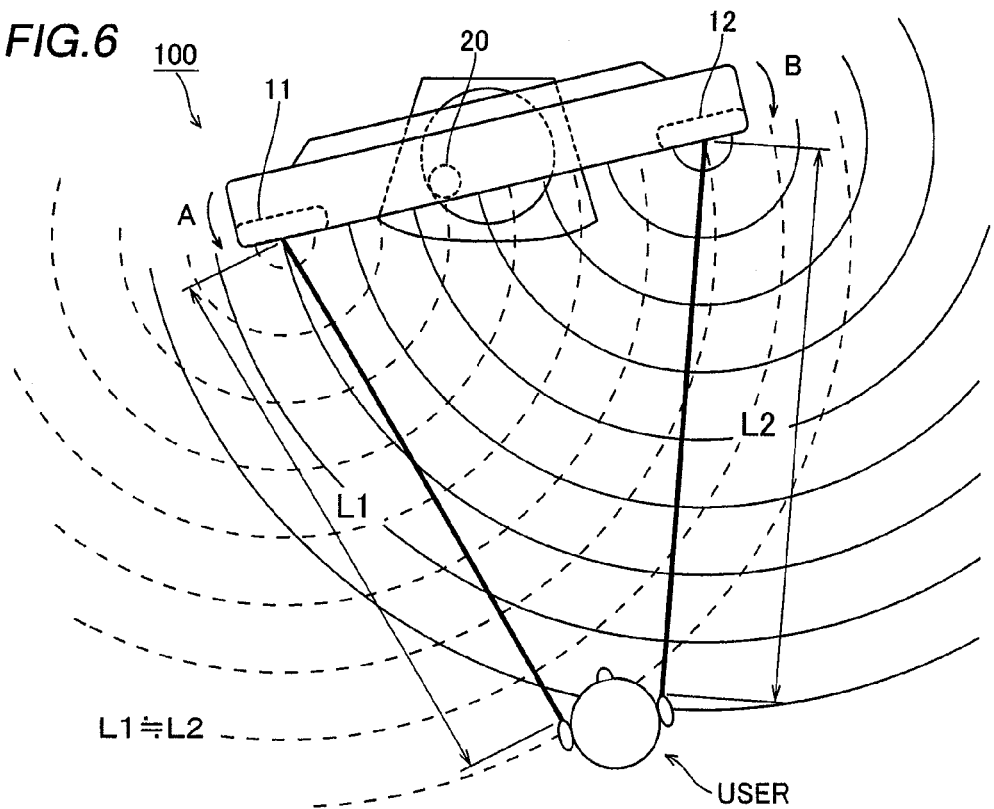

If determining that the display screen portion 10 has reached the maximum turning angle (about 30°) at the step S8, the control portion 37 advances to a step S7 and controls the display screen driving portion 20 to stop turning the display screen portion 10 along arrow A (see FIG. 6). If determining that the display screen portion 10 has not reached the maximum turning angle (about 30°) at the step S8, on the other hand, the control portion 37 returns to the step S3 for controlling the right speaker portion 11 similarly to the above. In other words, the display screen portion 10 is continuously turned along arrow A (see FIG. 6) while the right and left speaker portions 11 and 12 output the prescribed sounds respectively.

According to this embodiment, the control portion 37 determines whether or not the prescribed time (about five seconds) has elapsed after the user has stopped turning the display screen portion 10 along arrow A (see FIG. 6) at a subsequent step S9, and controls the right and left speaker portions 11 and 12 to continuously output the aforementioned sounds at a step S10 if determining that the prescribed time has not elapsed at the step S9. Thus, the user catches the sounds output from the right and left speaker portions 11 and 12 for the prescribed time after stopping turning the display screen portion 10, whereby the user can recognize the relation between the distances L1 and L2 (see FIG. 6) again.

When determining that the prescribed time (about five seconds) has elapsed after the user has stopped turning the display screen portion 10 along arrow A (see FIG. 6) at the step S9, on the other hand, the control portion 37 controls the right and left speaker portions 11 and 12 to stop outputting the aforementioned sounds having been continuously output at a step S11.

Thus, the user remotely turns the display screen portion 10 toward the desired direction and adjusts the display screen portion 10 to the position (correct position) optimum for receiving the television broadcast shown in FIG. 6.

According to this embodiment, as hereinabove described, the liquid crystal television 100 comprises the control portion 37 (see FIG. 2) controlling the right and left speaker portions 11 and 12 so that the right and left speaker portions 11 and 12 output the different sounds enabling the user to identify the distances L1 and L2 (see FIG. 5) from the right and left speaker portions 11 and 12 to the user respectively when the display screen driving portion 20 turns the display screen portion 10 leftward (along arrow A in FIG. 5) in the horizontal plane so that the magnitudes (sonority levels) of the sounds output from the right and left speaker portions 11 and 12 respectively regularly vary with the turning operation of the display screen portion 10 on an arbitrary position (observation point), whereby the user can identify the distances L1 and L2 (see FIG. 5) from the right and left speaker portions 11 and 12 to the user respectively by distinguishing the respective magnitudes (strength levels) of the sounds received from the right and left speaker portions 11 and 12 respectively from each other upon turning of the display screen portion 10. Therefore, the user can recognize that the distances L1 and L2 (see FIG. 6) from the right and left speaker portions 11 and 12 to the user are substantially equal to each other in relation to the rotational position of the display screen portion 10 when perceiving no variations in the respective magnitudes (strength levels) of the sounds received from the right and left speaker portions 11 and 12 along with the turning operation of the display screen portion 10 along arrow A (see FIG. 5). When remotely turning the display screen portion 10 toward the desired direction, the user may not wear a headset or the like, for example, in addition to the remote control operation. Therefore, the user can adjust the display screen portion 10 to the position for optimally receiving the television broadcast or the like with no complicated operation. Also when the display screen driving portion 20 turns the display screen portion 10 leftward (along arrow B in FIG. 5), effects similar to the above are attained.

According to this embodiment, the control portion 37 is so formed as to control the right and left speaker portions 11 and 12 to output the different sounds enabling the user to identify the distances L1 and L2 (see FIG. 5) from the right and left speaker portions 11 and 12 to the user respectively at substantially equal sound pressure levels (volumes) so that the sound pressure levels (magnitudes of the sounds) from the right and left speaker portions 11 and 12 can more remarkably vary with the turning operation of the display screen portion 10, whereby the user can easily perceive the degrees of the variations in the sound pressure levels. Thus, the user can easily determine the optimum broadcast receiving position (turning angle of the display screen portion 10) of the liquid crystal television 100.

According to this embodiment, the control portion 37 (see FIG. 2) is so formed as to control the right and left speaker portions 11 and 12 to output the sounds in the first and second frequency bands respectively so that the frequency bands of the sounds output from the right and left speaker portions 11 and 12 are different from each other, whereby the user can more reliably recognize not only the qualities of the sounds heard from the right and left speaker portions 11 and 12 respectively but also the degrees of variations in the qualities of the sounds heard from the right and left speaker portions 11 and 12 respectively.

According to this embodiment, the sounds in the first and second frequency bands are formed by the sine waves corresponding to the high-frequency band (around about 1000 Hz) and the low-frequency band (around about 500 Hz) in the audio range respectively so that the frequency bands of the sounds output from the right and left speaker portions 11 and 12 respectively are different from each other, whereby the user can easily distinguish the qualities of the sounds output from the right and left speaker portions 11 and 12 respectively from each other.

According to this embodiment, the liquid crystal television 100 comprises the remote photoreceiving portion 38 (see FIG. 1) capable of detecting an operating signal from the remote transmitter 60 and the control portion 37 (see FIG. 2) is so formed as to control the display screen driving portion 20 (see FIG. 1) on the basis of the operating signal received in the remote photoreceiving portion 38 from the remote transmitter 60 so that the user can easily adjust the optimum rotational position of the display screen portion 10 with the remote transmitter 60 also when receiving the television broadcast or the like at such a long distance that the user cannot directly operate the liquid crystal television 100 by touching the same with a finger or the like.

According to this embodiment, the control portion 37 (see FIG. 2) is so formed as to control the right and left speaker portions 11 and 12 to continuously output the sounds in the high-frequency band (around about 1000 Hz) and the low-frequency band (around about 500 Hz) for the prescribed time (about 5 seconds) after stopping turning the display screen portion 10 so that the right and left speaker portions 11 and 12 further output the sounds for 5 seconds on the rotational position of the display screen portion 10 decided by the user, whereby the user can easily confirm whether or not the rotational position of the display screen portion 10 is optimum.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the liquid crystal television 100 employed as an exemplary television set, the present invention is not restricted to this but is also applicable to a television set other than the liquid crystal television so far as the same comprises a driving portion driving a display screen portion.

While the control portion 37 is so formed as to control the right and left speaker portions 11 and 12 to output the sounds of the qualities corresponding to the high-frequency band (around about 1000 Hz) and the low-frequency band (around about 500 Hz) respectively in the aforementioned embodiment, the present invention is not restricted to this but the control portion 37 may alternatively control the right and left speaker portions 11 and 12 to output sounds of qualities corresponding to the low-frequency band (around about 500 Hz) and the high-frequency band (around about 1000 Hz) respectively.

While the control portion 37 is so formed as to control the right and left speaker portions 11 and 12 to output the sounds corresponding to the high-frequency band (around about 1000 Hz) and the low-frequency band (around about 500 Hz) respectively in the aforementioned embodiment, the present invention is not restricted to this but the control portion 37 may alternatively control both of the right and left speaker portions 11 and 12 to output sounds of qualities corresponding to the high-frequency band (around about 1000 Hz).

While both of the sounds output from the right and left speaker portions 11 and 12 have the qualities corresponding to the high-frequency band (around about 1000 Hz) in the aforementioned modification, the present invention is not restricted to this but the sounds output from the right and left speaker portions 11 and 12 may alternatively be intentionally provided with some frequency difference. When a difference of about several Hz (about 5 Hz) is provided between the frequencies of the sounds output from the right and left speaker portions 11 and 12 respectively, for example, the beats of the sounds output from the two speaker portions 11 and 12 are most remarkably caught by the user if the distances L1 and L2 from the right and left speaker portions 11 and 12 to the user are substantially identical to each other (L1≈L2). Through this principle, the user can determine that the display screen portion 10 is set on the position providing the optimum broadcast receiving state when most remarkably catching the beats upon the turning operation of the display screen portion 10. Also according to the structure of this modification, the user can easily adjust the display screen portion 10 to the position providing the optimum state for receiving the television broadcast or the like.

While the control portion 37 is so formed as to control both of the right and left speaker portions 11 and 12 to output the sounds having sine waveforms in the aforementioned embodiment, the present invention is not restricted to this but the control portion 37 may alternatively be so formed as to control the right and left speaker portions 11 and 12 to output sounds having triangular waveforms, rectangular waveforms or trapezoidal waveforms, for example, other than the sine waveforms.

While the control portion 37 is so formed as to control the right and left speaker portions 11 and 12 to output the sounds formed by the sine waves in the aforementioned embodiment, the present invention is not restricted to this but the control portion 37 may alternatively be so formed as to control the right and left speaker portions 11 and 12 to output sounds "right, right, right . . . " and "left, left, left . . . ", for example, enabling the user to specify the positions oscillating the sounds respectively. According to the structure of this modification, the user can identify the distances L1 and L2 from the right and left speaker portions 11 and 12 to the user respectively by distinguishing the sonority levels of the information received from the right and left speaker portions 11 and 12 respectively from each other along with the turning operation of the display screen portion 10. Thus, the user can easily determine the optimum broadcast receiving position (turning angle of the display screen portion 10).

While the control portion 37 is so formed as to control the right and left speaker portions 11 and 12 to output the sounds formed by the sine waves in the aforementioned embodiment, the present invention is not restricted to this but the control portion 37 may alternatively control the right and left speaker portions 11 and 12 to output sounds formed by triangular waves, trapezoidal waves or rectangular waves (pulse waves), for example, other than the sine waves.

While the control portion 37 is so formed as to control the right and left speaker portions 11 and 12 to output the sounds respectively through the sound source data stored in the sound source memory portion 39 when turning the display screen portion 10 in the aforementioned embodiment, the present invention is not restricted to this but the control portion 37 may alternatively control the right and left speaker portions 11 and 12 to output the different sounds after the audio processing portion 36 performs prescribed audio processing on a received audio signal of a television program or the like on the air. Also according to the structure of this modification, the user can distinguish variations in the strength levels of the sounds heard from the right and left speaker portions 11 and 12 respectively from each other, thereby adjusting the display screen portion 10 to the position optimum for receiving the television broadcast or the like.

While the sounds are output from the right and left speaker portions 11 and 12 respectively under substantially equal phase conditions in the aforementioned embodiment, the present invention is not restricted to this but a phase difference may alternatively be provided between the sounds output from the right and left speaker portions 11 and 12 respectively. When a phase difference of 180° ($\pi$ radians) is provided between the sounds output from the right and left speaker portions 11 and 12 respectively, for example, the sound waves oscillated from the two speaker portions 11 and 12 cancel each other so that the user catches no sounds if the distances L1 and L2 (see FIG. 6) from the right and left speaker portions 11 and 12 to the user are substantially equal to each other (L1≈L2). Through this principle, the user can determine that the display screen portion 10 is set on the rotational position providing the optimum broadcast receiving state when catching no sounds upon the turning operation of the display screen portion 10. Also according to the structure of this modification, the user can adjust the display screen portion 10 to the position providing the optimum state for receiving the television broadcast or the like.

While the display screen portion 10 is turned in the angular range of ± about 30° in the aforementioned embodiment, the present invention is not restricted to this but the display screen portion 10 may alternatively be turned in another angular angle other than ± about 30°.

What is claimed is:

1. A television set comprising:
a first speaker portion and a second speaker portion provided on prescribed left and right positions of a display screen portion respectively;
a driving portion turning said display screen portion; and
a control portion controlling said first speaker portion and said second speaker portion so that said first speaker portion and said second speaker portion output different sounds enabling the user to identify the distances from said first and second speaker portions to the user respectively when said driving portion turns said display screen portion, wherein
the control portion is so formed as to control the driving portion to stop turning of the display screen portion on the basis of a user's operation based on the different sounds enabling the user to identify the distances, which the first speaker portion and the second speaker portion output.

2. The television set according to claim 1, wherein
said control portion is so formed as to control said first speaker portion and said second speaker portion so that said first speaker portion and said second speaker portion output said different sounds, enabling the user to identify the distances from said first and second speaker portions to the user respectively, of sound pressure levels substantially equal to each other.

3. The television set according to claim 1, wherein
said control portion is so formed as to control said first speaker portion and said second speaker portion so that said first speaker portion and said second speaker portion output said different sounds, enabling the user to identify the distances from said first and second speaker portions to the user respectively, of phases substantially equal to each other.

4. The television set according to claim 1, wherein
said control portion is so formed as to control said first speaker portion and said second speaker portion so that said first speaker portion and said second speaker portion output said different sounds having a phase difference of a prescribed angle and enabling the user to identify the distances from said first and second speaker portions to the user respectively.

5. The television set according to claim 1, wherein
said control portion is so formed as to control said first speaker portion and said second speaker portion so that said first speaker portion and said second speaker portion output said different sounds which are sounds including information related to the positions of said first speaker portion and said second speaker respectively and enabling the user to identify the distances from said first and second speaker portions to the user respectively.

6. The television set according to claim 1, wherein
said control portion is so formed as to control said first speaker portion to output a sound in a first frequency band and to control said second speaker portion to output a sound in a second frequency band.

7. The television set according to claim 6, wherein
said sound in said first frequency band and said sound in said second frequency band have substantially identical frequencies.

8. The television set according to claim 6, wherein
said sound in said first frequency band and said sound in said second frequency band have a prescribed frequency difference.

9. The television set according to claim 8, wherein
said sound in said first frequency band has a sound quality corresponding to a high-frequency band in the audio range while said sound in said second frequency band has a sound quality corresponding to a low-frequency band in the audio range.

10. The television set according to claim 6, wherein
said control portion is so formed as to control said first speaker portion and said second speaker portion to output said sound in said first frequency band and said sound in said second frequency band having substantially identical waveforms.

11. The television set according to claim 1, further comprising a memory portion storing said different sounds enabling the user to identify the distances from said first and second speaker portions to the user respectively, wherein said control portion is so formed as to control said first speaker portion and said second speaker portion to output said different sounds enabling the user to identify the distances from said first and second speaker portions to the user respectively with said sounds stored in said memory portion.

12. The television set according to claim 1, further comprising a tuner portion receiving a broadcast signal including an audio signal, wherein said control portion is so formed as to control said first speaker portion and said second speaker portion so that said first speaker portion and said second speaker portion output said different sounds enabling the user to identify the distances from said first and second speaker portions to the user respectively by performing prescribed audio processing on said audio signal received by said tuner portion.

13. The television set according to claim 1, further comprising a signal receiving portion capable of detecting an operating signal from a remote transmitter, wherein said control portion is so formed as to control said driving portion turning said display screen portion on the basis of said operating signal received in said signal receiving portion from said remote transmitter.

14. The television set according to claim 13, wherein said control portion is so formed as to control said driving portion to stop turning said display screen portion while controlling said first speaker portion and said second speaker portion to continuously output said different sounds when said display screen portion reaches a prescribed turning angle.

15. The television set according to claim 1, wherein said control portion is so formed as to control said first speaker portion and said second speaker portion to continuously output said different sounds for a prescribed time after said driving portion stops turning said display screen portion.

* * * * *